Aug. 14, 1962   W. C. KLANK, JR   3,049,138
LIQUID STORAGE TANK
Filed April 27, 1961
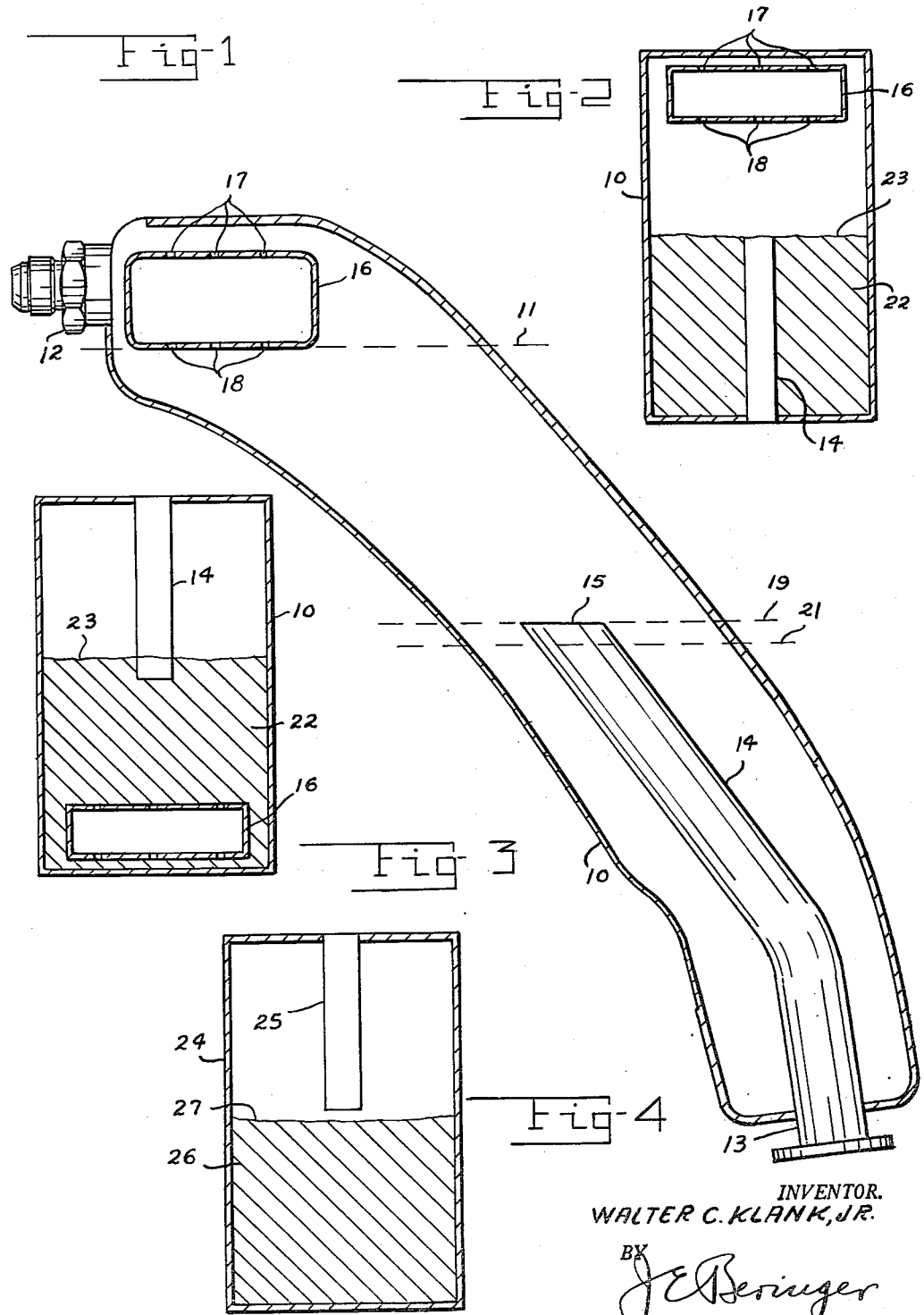

United States Patent Office 3,049,138
Patented Aug. 14, 1962

3,049,138
LIQUID STORAGE TANK
Walter C. Klank, Jr., Dayton, Ohio, assignor to United Aircraft Products, Inc., Dayton, Ohio, a corporation of Ohio
Filed Apr. 27, 1961, Ser. No. 106,119
9 Claims. (Cl. 137—38)

This invention relates to liquid storage tanks assuming varying attitudes relative to the earth's surface, and the invention has particular reference to tanks in aerial craft which in use may be inverted or subject to an equivalent effect resulting from the application of negative gravity forces.

Tanks as described may be utilized to supply liquid to one or a plurality of systems. The instant invention has especial although not limited reference to tanks supplying multiple systems in accordance with a priority concept in which a decreasing volume of liquid in the tank will find supply being maintained to the more critical system or systems while discontinued with respect to less critical systems. Thus, a tank of the kind with which this invention is concerned provides a fixed point outlet in an intermediate location of the tank interior whereby the system supplied from such outlet will receive liquid from the tank only when the tank is full and during a decreasing volume range to a predetermined low level. Thereafter the system supplied from such outlet is isolated insofar as the tank is concerned.

It is under some conditions desirable, however, to make a further volume of oil available to the mentioned system under certain flight conditions or attitudes, as when the aicraft is in an inverted attitude or is subject to negative gravity. In accordance with the instant inventive concept, therefore, an additional amount of liquid may be made available to a selected system beyond the point at which supply to such system would normally be cut off in accordance with the priority concept, under inverted or negative gravity conditions and for a limited time interval.

An object of the invention is to introduce a mode of operation as described in liquid storage tanks of the kind to which this invention is directed.

Another object of the invention is to provide means for artificially raising the liquid level within the tank in certain flight attitudes or conditions to make available for a limited period of time an additional amount of liquid for use in a supplied system.

A further object of the invention, in a priority system of supply in a liquid storage tank, is to increase the volume of liquid which may be drawn from the tank under certain flight conditions by a selected system, or, alternatively, to compensate for a larger interior space in the upper part of the tank so that upon inversion there still will be made available to the selected system liquid down to the predetermined liquid volume at which flow to said system is to be cut off.

Other objects and structural details of the invention will appear from the following description when read in connection with the accompanying drawing, wherein:

FIG. 1 is a partly diagrammatic view in side section of a liquid storage tank in accordance with the illustrated embodiment of the invention;

FIG. 2 is a diagram of a tank as shown in FIG. 1, showing the tank in a normal attitude and with a given volume of liquid therein, the volume being in the illustrated instance that defining the cut off point for the supplied system in a normal tank attitude;

FIG. 3 is a view like FIG. 2, with the tank inverted and the displacement chamber empty of liquid; and FIG. 4 is a view like FIG. 3 showing the liquid level in the tank as it appears in the absence of the displacement chamber.

Referring to the drawings, a liquid storage tank of the kind to which this invention relates is only generally and diagrammatically indicated herein. The invention is concerned with but a single system supplied from such a tank although it will be understood that other systems are supplied from the tank in accordance with a priority concept. In the illustrated instance a tank comprises a shell 10 of generally arcuate shape containing a body of liquid occupying less than the entire interior of the tank, the normal full level being approximately as indicated by the line 11. Having its customary use in a liquid circulating system, the tank has an inlet 12 in the upper part thereof, and, in the selected system with which the invention is concerned, an outlet 13 at its lower end. From the outlet 13 there extends upward within the tank a tube 14. The upwardly extending tube is spaced from front and back walls of the tank shell 10 and from the sides thereof. Its upper end terminates in an open mouth 15 to which the contained body of liquid has free access as long as the level of such body is above the upper end of the tube. The outlet 13 thus is in continuous communication with the interior of the tank but at a fixed intermediate location in the tank, near the volumetric center thereof, or near the volumetric center of any compartment of which the tube 14 is a part. As a result, the system communicating with the tank by way of outlet 13 may freely draw on the liquid contained in the tank as long as such contained volume places the liquid level above the open upper end of tube 14. When, however, depletion of the liquid supply has caused the liquid level in the tank to drop below the upper end of tube 14 then the system supplied from outlet 13 is cut off from the source of supply and hence is unable further to deplete the liquid in the tank.

In the upper part of the tank, above the full level line 11, and occupying a substantial part of the space above such line, is a sub-tank or container 16. The sub-tank or container is suitably fixed within the tank and is hollow to serve as an air or displacement chamber. It has, to this end, restricted communication with the tank interior by reason of respective series of small diameter openings 17 and 18 in the top and bottom of the container respectively. These openings connect the container interior to the interior proper of the tank for a free circulation of air and further permit use of the space occupied by the container 16 as an expansion space. However, the restricted character of the communication afforded by the openings 17 and 18 inhibits a free movement of liquid into the container so that in the event of a rise or movement of liquid into the upper part of the tank shell, as a result of tilting movements of the tank, inversion thereof, or the application of negative gravity forces, the contained volume of liquid in the tank tends artificially to rise by an amount corresponding to the amount of liquid displace by the container 16.

Liquid level lines in FIG. 1 illustrate the above principle. A line 19 which coincides with the upper open end 15 of outlet tube 14 indicates the liquid level at the cut-off point under condition of normal flight and tank attitude. There remains in the tank at this time a given volume of liquid to be drawn on by the other system or systems utilizing the tank as a liquid source. Should this given volume of liquid move into the normal upper part of the tank a quantity thereof is displaced by the container 16, causing the liquid level to rise relative to the normal level. Thus, at this time the upper liquid level is at a line indicated at 21 which as may be seen is sufficient to submerge the open end 15 of the tube 14. The system supplied by tube 14 accordingly has an additional amount of liquid upon which it can draw. This amount is limited as to quantity since it is undesirable to drain the tank of all of its liquid, and further is limited as to the period of time in which it can be used. The openings 17 and 18 in the container 16 provide for restricted flow of the liquid into the container so that during a selected time interval (the length of which is determined by the number and size of such openings) the contained liquid volume will remain artificially expanded but will thereafter resume its normal volume condition. The construction and arrangement of the tank may in this connection be described as serving to make available to the system served by outlet tube 14 a predetermined emergency amount of liquid for a predetermined length of time under non-normal flight conditions. In another sense the structure may be considered to make available to tube 14, in inverted flight conditions, the same volume of liquid that is available to it in a normal flight attitude, despite increased interior space in the upper part of the tank, as compared to the lower part.

The principle of the invention is illustrated in the diagrams of FIGS. 2, 3 and 4 where the same reference numerals are used to indicate like parts as are used in FIG. 1. Thus a tank 10 therein is shown as having an outlet 14 reaching from the normal bottom part of the tank into an intermediate location near the volumetric center of the tank. A perforate displacement chamber 16 is in the normal upper part of the tank 10 while the shaded portion of the drawing indicates a body 22 of liquid having a level 23. In the several diagrams a given volume of liquid is shown as being present in the tank, this volume corresponding to that normally representing the cut-off point with reference to tube 14, the level of which is indicated at 19 in FIG. 1. The tank is shown in a normal attitude in FIG. 2. In FIG. 3 the tank has been inverted, with the same volume of liquid therein. As here indicated, however, the chamber 16 has displaced an amount of liquid sufficient to raise the level 23 above the tip of tube 14 thus making a further quantity of liquid available to the system served by tube 14. FIG. 4 shows a tank 24 having an outlet tube 25 located like and corresponding to the outlet tube 14, and further shows contained in the tank a volume or body 26 of liquid in a volume corresponding to the body of liquid 22. In this instance, however, the displacement chamber 16 is absent. Under this circumstance, therefore, in an inverted position of the tank the level of the liquid is below or spaced from the open end of tube 25 and no liquid is available to the tube, either for emergency use in accordance with the one inventive concept or for continued access up to the selected cut-off point, in accordance with the other aspect of the invention.

What is claimed is:

1. A liquid storage tank which in use assumes different attitudes relative to the earth's surface and may be subject to negative gravity forces, including means defining an interior chamber in said tank having normal upper and lower portions, said tank having an intermediate normal liquid level, a liquid outlet communicating with a fixed intermediate location in said chamber, and means in the normal upper portion of said chamber effectively isolating a portion of said chamber from the chamber proper during an inverted attitude and under negative gravity conditions for a predetermined time interval only.

2. A liquid storage tank which in use assumes different attitudes relative to the earth's surface and which may be subject to negative gravity forces, including means defining an interior chamber in said tank having normal upper and lower portions, said tank having an intermediate normal liquid level, a liquid outlet communicating with a fixed intermediate location in said chamber, and means in the normal upper portion of said chamber displacing liquid in an inverted attitude and under negative gravity conditions only for a limited time interval.

3. A liquid storage tank according to claim 2, characterized in that said last named means comprises an enclosure occupying a part of the normal upper portion of said chamber and in restricted communication with the chamber proper.

4. A liquid storage tank which in use assumes different atitudes relative to the earth's surface and which may be subject to negative gravity forces, including means defining an interior chamber in said tank having normal upper and lower portions, said tank having an intermediate normal liquid level, a liquid outlet communicating with a fixed intermediate location in said chamber, and liquid displacement means in the normal upper portion of said chamber effecting an inverted tank attitude or under negative gravity conditions a rise in liquid level in said chamber for a predetermined time interval.

5. A liquid storage tank according to claim 4, characterized in that said last named means comprises an enclosure having a wall formed with openings of small flow area whereby to inhibit liquid flow therethrough while permitting use of the enclosure space as an expansion and air chamber under conditions of upright tank attitude and normally applied gravity.

6. A liquid storage tank assuming in use different attitudes relative to the earth's surface, including a liquid outlet, a tube extending from said outlet within the tank and terminating in an open end at an intermediate location in the tank, the location of said open end being determined to receive liquid from a contained body of liquid in the tank under conditions of a full volume to a predetermined low volume, and means for raising the liquid level in the tank relative to said open end of said tube in an inverted attitude for a limited time only to supply the open end of the tube in said time interval with liquid despite a limited decrease in the liquid volume below said predetermined low volume.

7. A liquid storage tank assuming in use different atitudes relative to the earth's surface including a liquid outlet, a tube extending from said outlet within the tank and terminating in an open end at an intermediate location in the tank, there being a body of contained liquid in said tank communicating with said open end of said tube in a normal tank attitude through decreases in liquid volume to a predetermined level, and means providing for continued communication of said body of liquid with said open end of said tube through decreases in liquid volume below said predetermined level in an inverted tank attitude for a limited time interval.

8. A liquid storage tank for aircraft assuming in use different attitudes relative to the earth's surface, including a liquid outlet, a tube extending from said outlet within the tank and terminating in an open end at an intermediate location in the tank, there being a contained body of liquid in the tank and said open tube end being located to accept liquid from said contained body through decreases in liquid volume to a certain level in a normal tank attitude and in attitudes of predetermined roll, climb and dive inclination, and means in the upper part of the tank for artificially raising the level of the contained body of liquid in the tank for a continued supply of liquid to said open tube end through decreases in liquid volume below said certain level to another lower level under conditions of inverted attitude or negative gravity for a limited time only.

9. A liquid storage tank for aircraft assuming in use different attitudes relative to the earth's surface, including a liquid outlet, a tube extending from said outlet within the tank and terminating in an open end at an intermediate location in the tank, said tank having a contained body of liquid and said open end of said tube being located to accept liquid from said contained body through decreases in liquid volume to a certain level in normal tank attitudes, and means in the upper part of the tank for artificially raising the level of the contained body of liquid for a limited time only under conditions of inverted attitude or negative gravity in order that said outlet may under the described conditions receive liquid from the contained body beyond the level at which communication with the outlet normally is cut off.

No references cited.